(12) United States Patent
Ogawa et al.

(10) Patent No.: US 9,046,378 B2
(45) Date of Patent: Jun. 2, 2015

(54) DRIVING ASSISTANCE DEVICE

(75) Inventors: Masahiro Ogawa, Toyota (JP); Akihiro Tsukada, Oiso-machi (JP); Franck Galpin, Numazu (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 124 days.

(21) Appl. No.: 13/812,156

(22) PCT Filed: Jul. 27, 2010

(86) PCT No.: PCT/JP2010/062605
§ 371 (c)(1),
(2), (4) Date: Mar. 29, 2013

(87) PCT Pub. No.: WO2012/014280
PCT Pub. Date: Feb. 2, 2012

(65) Prior Publication Data
US 2013/0218467 A1    Aug. 22, 2013

(51) Int. Cl.
*G01C 21/00* (2006.01)
*G08G 1/123* (2006.01)
*G01C 21/34* (2006.01)
*G08G 1/0968* (2006.01)
*G01C 21/26* (2006.01)
*G08G 1/16* (2006.01)

(52) U.S. Cl.
CPC ...... *G01C 21/3415* (2013.01); *G08G 1/096827* (2013.01); *G08G 1/096844* (2013.01); *G01C 21/26* (2013.01); *G01C 21/3407* (2013.01); *G08G 1/166* (2013.01); *G08G 1/167* (2013.01)

(58) Field of Classification Search
CPC ........... B60L 2260/52; B60L 2240/645; Y02T 90/162; F02D 2200/702; G01C 21/3647
USPC .......................... 701/400–541; 340/988–996
See application file for complete search history.

(56) References Cited

U.S. PATENT DOCUMENTS

| 5,585,798 | A | 12/1996 | Yoshioka et al. |
| 6,847,894 | B1 | 1/2005 | Hasegawa |
| 2008/0122604 | A1 | 5/2008 | Hattori et al. |
| 2008/0266168 | A1 | 10/2008 | Aso et al. |
| 2009/0077221 | A1* | 3/2009 | Eisenstadt et al. ............ 709/224 |

FOREIGN PATENT DOCUMENTS

| CN | 101770690 | 7/2010 |
| JP | 2004-102439 | 4/2004 |
| JP | 2005-310043 | 11/2005 |
| JP | 2006-92258 | 4/2006 |
| JP | 2006-119090 | * 5/2006 |

(Continued)

*Primary Examiner* — Muhammad Shafi
(74) *Attorney, Agent, or Firm* — Finnegan, Henderson, Farabow, Garrett & Dunner, LLP

(57) ABSTRACT

Provided is a driving assistance device that includes traveling route information acquiring means for acquiring a plurality of traveling route information items about different recognition ranges and course generating means for generating a course of a host vehicle using the plurality of traveling route information items according to a traveling environment. According to the invention, for example, a plurality of traveling route information items with different recognition ranges, such as a wide-area map 1, a middle-area map 2, and a local map 3, are used according to a traveling environment to generate a course. In this way, the host vehicle can travel safely.

11 Claims, 28 Drawing Sheets

(56) References Cited

FOREIGN PATENT DOCUMENTS

| JP | 2006-154967 | 6/2006 |
| JP | 2006-330279 | 12/2006 |
| JP | 2007-233764 | 9/2007 |
| JP | 2007-240319 | 9/2007 |
| JP | 2007-323183 | 12/2007 |
| JP | 2008-132938 | 6/2008 |
| JP | 2009-211534 | 9/2009 |
| JP | 2010-026104 | 2/2010 |
| WO | WO 2004/048895 A1 | 6/2004 |

* cited by examiner

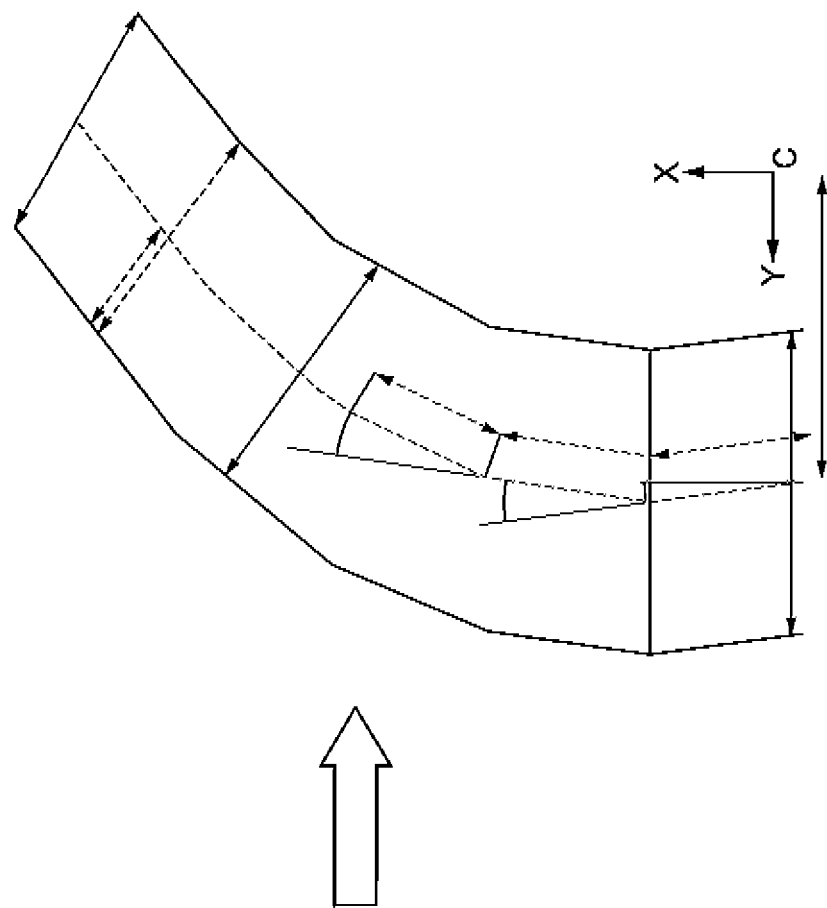
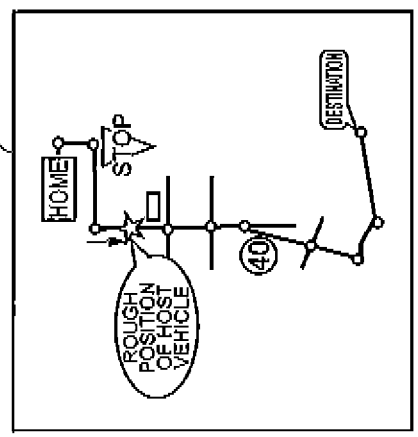
Fig.6

Fig.7
(a) 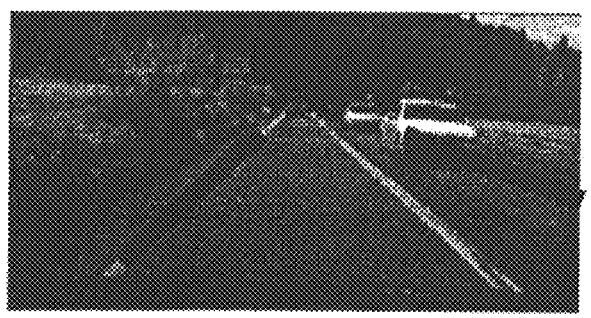
(b) 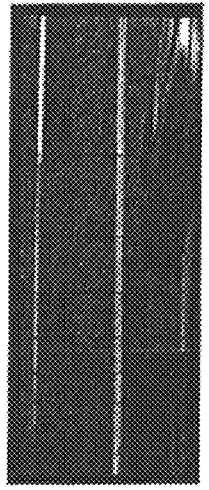

Fig.8
(a) 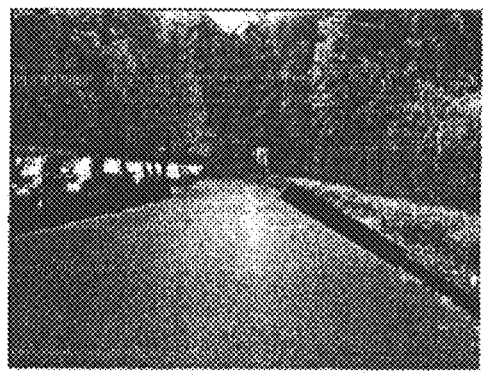
(b) 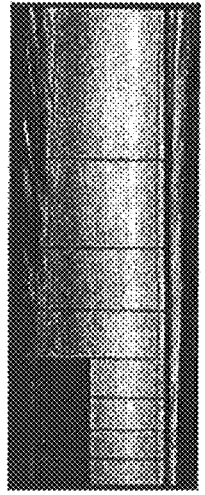

Fig.10
(a) 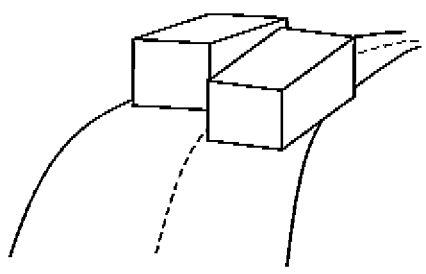
(b) 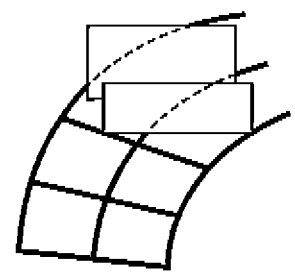

*Fig.13*
(a) 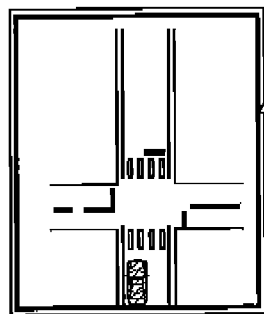
(b) 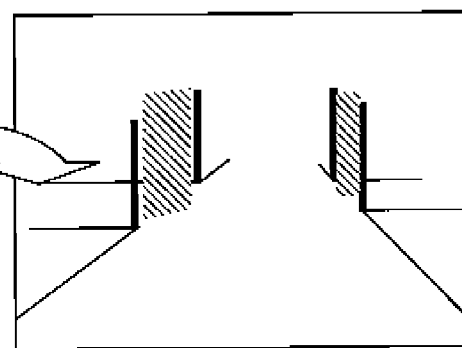

(a)            (b)

DRIVING ASSISTANCE DEVICE

CROSS-REFERENCE TO RELATED APPLICATIONS

This application is a national phase application of International Application No. PCT/JP2010/062605, filed Jul. 27, 2010, the content of which is incorporated herein by reference.

TECHNICAL FIELD

The present invention relates to a driving assistance device.

BACKGROUND ART

A driving assistance device has been known which creates map data used for, for example, driving assistance. Patent Literature 1 discloses a vehicle map data creating device which detects the side ends of the road and creates, on the basis of one of the detected side ends, data for the relative position of the other side end, thereby creating map data without increasing data capacity.

CITATION LIST

Patent Literature

[Patent Literature 1] Japanese Unexamined Patent Application Publication No, 2007-240319

SUMMARY OF INVENTION

Technical Problem

However, in the vehicle map data creating device disclosed in Patent Literature 1 which detects the side edge of the road in the close range and creates the map data, for example, since road elements which are far away from the vehicle are not considered, the reliability of the created vehicle map data needs to be improved for driving assistance.

An object of the invention is to provide a driving assistance device which generates a course such that the host vehicle can travel safely.

Solution to Problem

In order to achieve the object, a driving assistance device according to the invention includes traveling route information acquiring means for acquiring a plurality of traveling route information items with different recognition ranges; and course generating means for generating a course of a host vehicle using the plurality of traveling route information items according to a traveling environment.

As an example of the recognition range, a wide-area map, a middle-area, map, and a local map are set from the distance in map information. However, the recognition range may be defined by various other methods.

For example, the wide, middle, and local ranges may be set by the arithmetic processing time of an ECU in the setting of the route, instead of the distance range.

In addition, the recognition range may be set as a region in which obstacles can be recognized by an imaging device, a broadband radar, or a narrowband radar provided in the vehicle. For example, a range in which the detection accuracy of the narrowband radar is high may be set as the middle range and a range in which the detection accuracy of the broadband radar is high may be set as the local range. In addition, a far-field region in which an intersection, a white line, a road shape, or other obstacles cannot be clearly recognized by images may be set as the middle range and a near-field region in which they can be clearly recognized may be set as the local region. A region in which whether a reflector is a ghost or an object cannot be clearly determined in the search range of the radar may be set as the middle range and a region in which whether the reflector is a ghost or an object can be clearly determined may be set as the local range.

In addition, the ranges may be classified according to the likelihood of recognition, that is, the probability of it being recognized, in addition to whether an object or an obstacle can be recognized.

According to the invention, since the course is generated using a plurality of traveling route information items with different recognition ranges according to the traveling environment, the host vehicle can travel safely.

In the driving assistance device according to the invention, the plurality of traveling route information items may have different update frequencies. Since the plurality of traveling route information items may have different update frequencies, it is possible to reduce an arithmetic load for updating information.

The driving assistance device according to the invention may further include scheduled traveling route information acquiring means for acquiring scheduled traveling route information from the traveling route information with a specific recognition range among the plurality of traveling route information items and travelable region detecting means for detecting a travelable region in a traveling route. The shape of a scheduled traveling route may be estimated on the basis of the scheduled traveling route information and the travelable region. Since the scheduled traveling route information and the travelable region obtained by the means are used, it is possible to estimate the shape of the scheduled traveling route with high accuracy.

In the driving assistance device according to the invention, the scheduled traveling route may be divided to estimate the shape. Since the scheduled traveling route is divided, it is possible to further improve the estimation accuracy of the shape.

The driving assistance device according to the invention may further include shape model storage means for storing the shape of the traveling route as a shape model. The shape of the scheduled traveling route may be estimated on the basis of the scheduled traveling route information and the shape model. Even when it is difficult to detect the travelable region, the use of the shape model makes it possible to estimate the shape of the scheduled traveling route with high accuracy.

The driving assistance device according to the invention may further include previous traveling route accumulation means for accumulating previous traveling route information. The shape of the scheduled traveling route may be further estimated on the basis of the degree of coincidence between the previous traveling route information and the estimated shape of the scheduled traveling route. When the degree of coincidence is high, it is possible to estimate the shape of the scheduled traveling route with high accuracy. When the degree of coincidence is low, the estimated shape of the scheduled traveling route is, for example, corrected so as to be estimated with high accuracy.

The driving assistance device according to the invention may further include obstacle information acquiring means for acquiring information about an obstacle around the host vehicle. A search range for acquiring the obstacle information may be determined using information about an edge in the estimated shape of the scheduled traveling route. Since the search range for acquiring the obstacle information is determined using the information about the edge in the estimated shape of the scheduled traveling route, it is easy to acquire information about obstacles around the host vehicle.

The driving assistance device according to the invention may further include obstacle information acquiring means for acquiring information about an obstacle around the host vehicle. A movable range of the obstacle may be set in the estimated scheduled traveling route. When the obstacle moves beyond the movable range, the course of the host vehicle for the obstacle may be generated using the traveling route information with a scale less than that of the scheduled traveling route. Since the movable range of the obstacle is set in the estimated scheduled traveling route, it is possible to reduce a calculation load. Since small-scale traveling route information is used when the obstacle is beyond the movable range, it is possible to acquire information about obstacles with high accuracy.

The driving assistance device according to the invention may further include image acquiring means for acquiring information about an obstacle around the host vehicle with an image. The obstacle may be specified on the basis of the image and the estimated shape of the scheduled traveling route. Since the image obtained by the image acquiring means and the estimated shape of the scheduled traveling route are used, it is possible to specify an obstacle with high accuracy and the host vehicle can travel safely.

In the driving assistance device according to the invention, the obstacle information in the traveling route information with the specific recognition range among the plurality of traveling route information items may be integrated with traveling route information with a scale less than that of the traveling route information with the specific recognition range to create a grid of information, thereby estimating the obstacle information. Since the obstacle information is integrated with small-scale traveling route information to create a grid of information, it is possible to perform an avoidance behavior according to the attribute of obstacles and the host vehicle can travel safely.

In the driving assistance device according to the invention, a portion of the grid may be subdivided. Since a portion of the grid is subdivided, it is easy to perform an avoidance behavior for obstacles and the host vehicle can travel safely.

In the driving assistance device according to the invention, the scale of the grid may vary depending on a speed of the host vehicle. Since the scale of the grid varies depending on the speed of the vehicle, it is possible to effectively process information and ensure the safety of the host vehicle.

Advantageous Effects of Invention

According to the invention, it is possible to provide a driving assistance device which generates a course with high accuracy such that the host vehicle can travel safely.

BRIEF DESCRIPTION OF DRAWINGS

FIG. 6 is a diagram illustrating scheduled traveling route information and a travelable region.
FIG. 7($a$) is a diagram illustrating a traveling route and FIG. 7($b$) is a diagram illustrating the estimated shape of a scheduled traveling route.
FIG. 8($a$) is a diagram illustrating a traveling route and FIG. 8($b$) is a diagram illustrating the estimated shape of a scheduled traveling route.
FIG. 10($a$) is a diagram illustrating a travelable region which cannot be completely detected due to obstacles and FIG. 10($b$) a diagram illustrating a shape model.
FIG. 13($a$) is a diagram illustrating the shape of a scheduled traveling route projected onto an image and FIG. 13($b$) is a diagram illustrating a set vertical edge.

DESCRIPTION OF EMBODIMENTS

Figure 1:
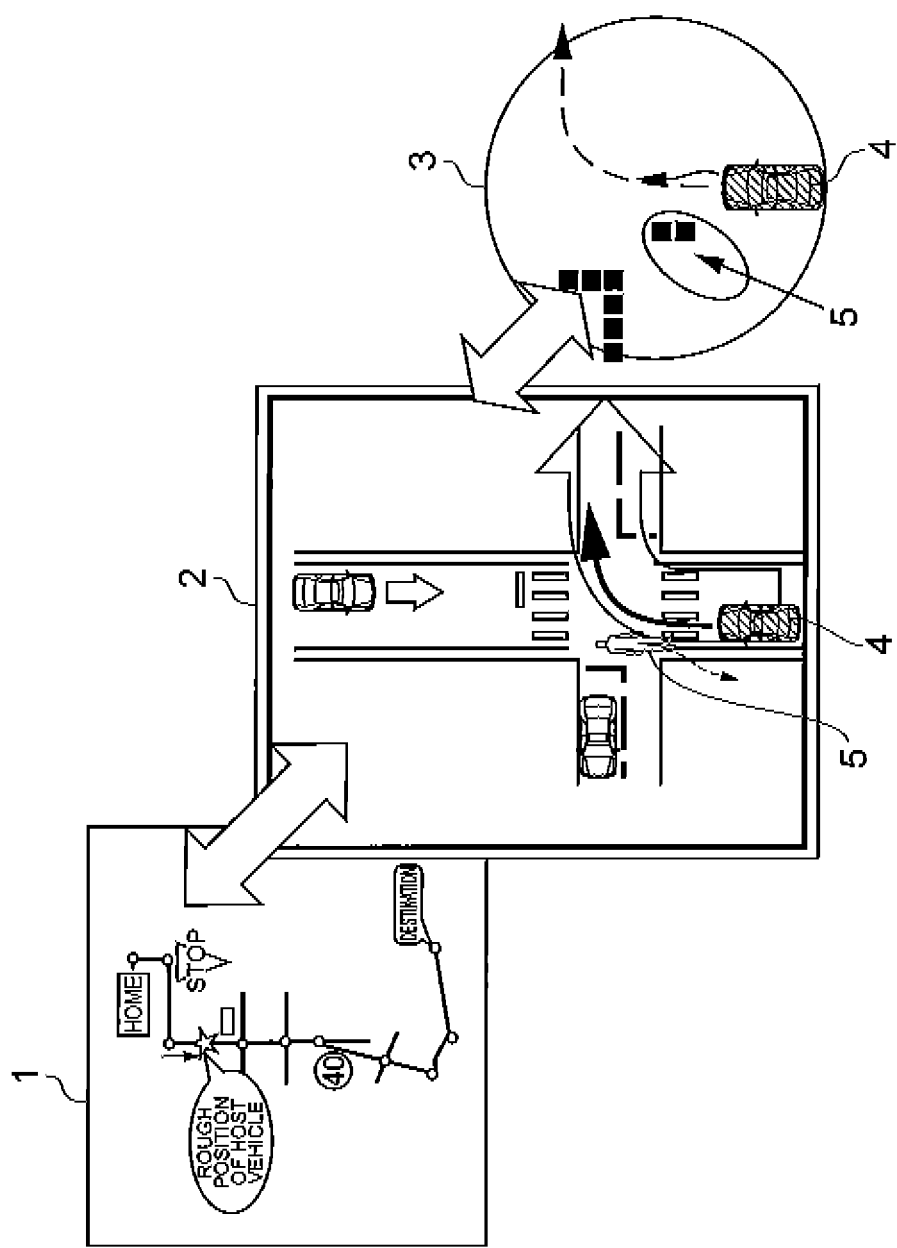
FIG. 1 is a diagram illustrating a plurality of traveling route information items with different recognition ranges according to a first embodiment of the invention.

Hereinafter, exemplary embodiments of the invention will be described. In the drawings, the same components are denoted by the same reference numerals and the description thereof will not be repeated. In addition, the dimensions and scales of the drawings are not necessarily equal to those in the description.

First Embodiment

Figure 28:
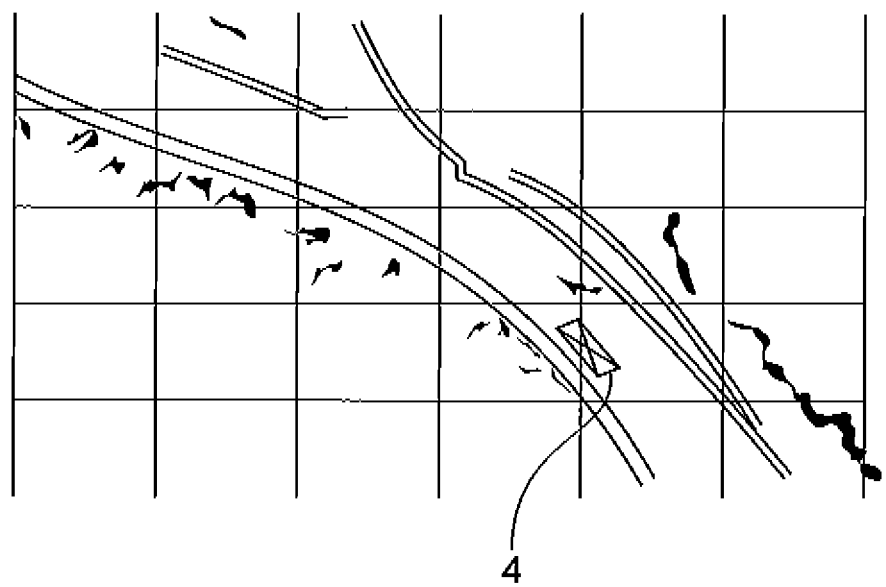
FIG. 28 is a diagram illustrating specific traveling route information according to the related art.

First, a driving assistance device according to a first embodiment of the invention will be described. In the related art, for example, as shown in FIG. 28, traveling route information with a constant and single recognition range is used to generate the course of the host vehicle from a starting point to a destination.

In contrast, the driving assistance device according to the first embodiment includes a traveling route information acquiring unit that acquires a plurality of traveling route information items with different recognition ranges and a course generating unit that generates the course of the host vehicle using the plurality of traveling route information items according to a traveling environment. FIG. 1 is a conceptual diagram illustrating the plurality of traveling route information items with different recognition ranges, in which a wide-area map 1, a middle-area map 2, and a local map 3 are given as examples of maps with different scales.

The wide-area map 1 indicates traveling route information in a region of, for example, several to several hundreds of square kilometers and is used to determine the rough traveling route of the host vehicle from the starting point to the destination.

The middle-area map 2 indicates traveling route information in a region of, for example, several tens to several hundreds of square meters and is used to recognize, for example, pedestrians or other vehicles and predict the movement thereof. Therefore, it is preferable that the middle-area map 2 be constructed with the coordinates (relative coordinates) based on the host vehicle.

The local map 3 indicates traveling route information in a region of for example, several to several tens of square meters and is used to detect the movement of the pedestrian or other vehicles which cannot be recognized in the middle-area map 2 and avoid them. Therefore, it is preferable that the local map 3 be constructed with the coordinates (relative coordinates) based on the host vehicle.

It is preferable that the plurality of traveling route information items with different recognition ranges have different update frequencies. When the plurality of traveling route information items with different recognition ranges have different update frequencies, a calculation load for information update is reduced. In addition, it is preferable that the frequency of update be reduced as the size of the map increases. For example, it is preferable that the frequency of update of the map indicating wide-area traveling route information, such as the wide-area map 1, be low. For example, it is preferable that the map be updated at an interval of about 5 seconds. It is preferable that the frequency of update of the map used to recognize, for example, the pedestrians or other vehicles and predict the movement of them, such as the middle-area map 2, be slightly high. For example, it is preferable that the map be updated at an interval of about 200 milliseconds. It is preferable that the frequency of update of the map used to detect or avoid the pedestrian who suddenly comes out, such as the local map 3, be high. For example, it is preferable that the map be updated at an interval of about 10 milliseconds.

In this embodiment, as an example of the recognition range, the wide-area map, the middle-area map, and the local map are set according to the distance in the map information. However, the recognition range may be defined by various other methods. For example, the wide range, the middle range, and the local range may be set according to the arithmetic processing time of an ECU in route setting, instead of the distance range. In addition, the recognition range may be set to a range in which an obstacle can be recognized by, for example, an imaging device, a broadband radar, and a narrowband radar provided in the vehicle. For example, a range in which the detection accuracy of the narrowband radar is high may be set as the middle range and a range in which the detection accuracy of the broadband radar is high may be set as the local range. In addition, a far-field region in which an intersection, a white line, a road shape, or other obstacles cannot be clearly recognized by images may be set as the middle range and a near-field region in which, they can be clearly recognized may be set as the local region. A region in which whether a reflector is a ghost or an object cannot be clearly determined in the search range of the radar may be set as the middle range and a region in which whether the reflector is a ghost or an object can be clearly determined may be set as the local range. In addition, the middle range and the local range may be classified according to the likelihood of recognition, that is, probability, in addition to whether an object or an obstacle can be recognized. The imaging range of the imaging device and the search range of a laser scanner may be set as the middle range and the local range, respectively.

Furthermore, events and labels detected in the wide-area map, the middle-area map, and the local map are provided as information to other maps and are used to change the route in the map or all maps. For example, information which is provided from a traffic information center, such as a VICS or a probe car, congestion information obtained by road-to-vehicle communication or inter-vehicle communication, and accident information in the middle-area map are provided to the local map and are used to change the route. When information about the pedestrian who crosses the road is obtained from, for example, an image in the middle-area map, it is provided to the local map or the wide-area map and is used to change the route. When, for example, an obstacle, such as an empty can, on the road is detected by the radar scanner in the local map, information about the obstacle is provided to the middle-area map or the wide-area map and is used to change the route.

Figure 2:
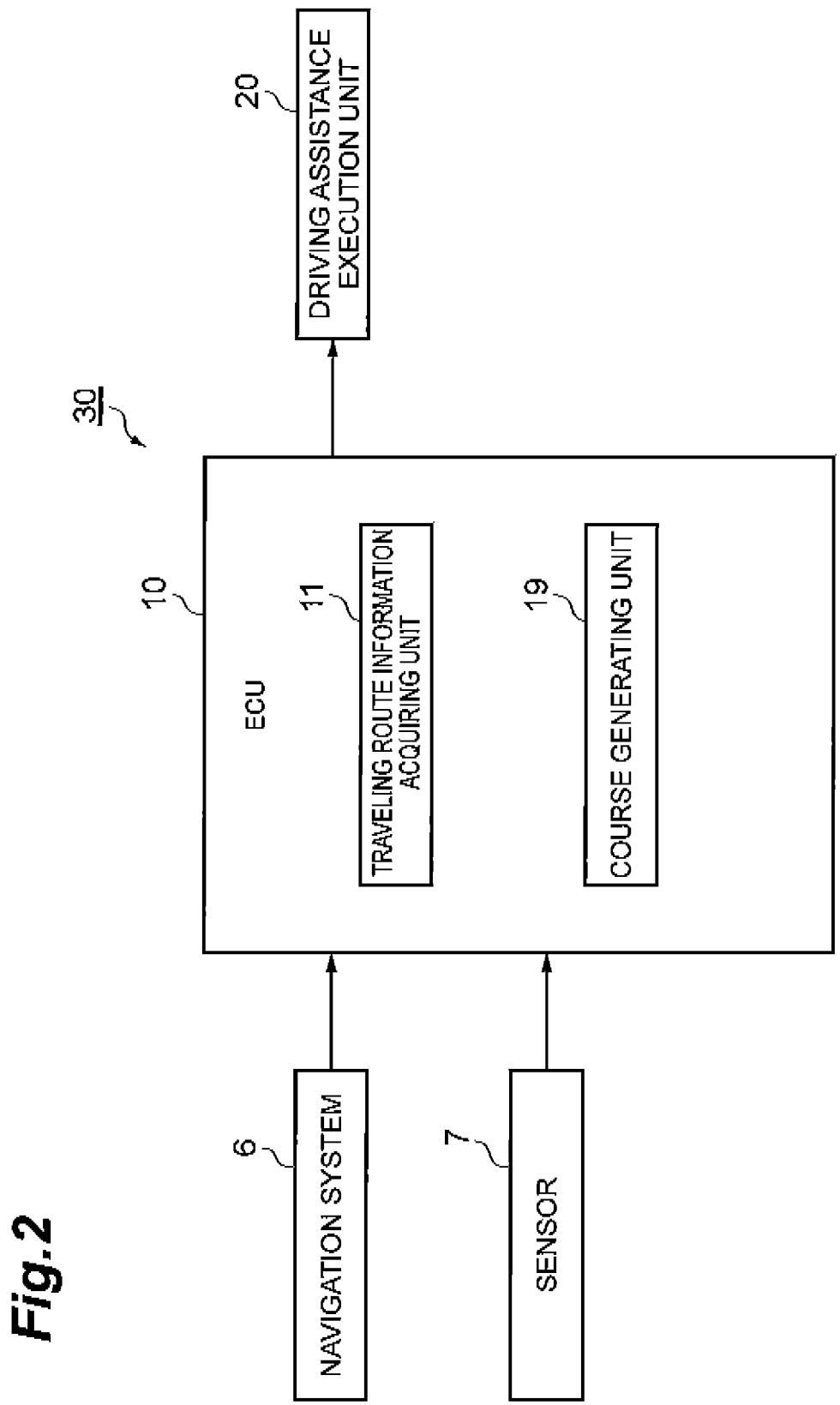
FIG. 2 is a block diagram illustrating a driving assistance device according to the first embodiment of the invention.

FIG. 2 is a block diagram illustrating the driving assistance device according to the first embodiment. A driving assistance device 30 according to the first embodiment generates a high-accuracy course such that the host vehicle can travel safely. As shown in FIG. 2, the driving assistance device 30 includes a navigation system 6, a sensor 7, an electronic control unit (hereinafter, referred to as an "ECU") 10, and a driving assistance execution unit 20. The ECU 10 is electrically connected to the navigation system 6, the sensor 7, and the driving assistance execution unit 20.

The navigation system 6 measures the absolute position of the host vehicle on the surface of the earth using a GPS (Global Positioning System). The absolute position of the host vehicle on the surface of the earth measured by the GPS is compared with map information which is separately stored. In this way, the navigation system 6 can provide the traveling route information which specifies the position of the host vehicle on the map to the ECU 10.

The sensor 7 acquires information about the surroundings of the host vehicle. For example, a millimeter-wave radar which detects objects around the host vehicle is used as the sensor 7.

The ECU 10 includes, for example, a CPU which performs arithmetic processing, a ROM and a RAM which serve as a storage unit, an input signal circuit, an output signal circuit, and a power circuit. For example, the CPU of the ECU 10 executes a program stored in the storage unit to form a traveling route information acquiring unit 11 and a course generating unit 19.

The traveling route information acquiring unit 11 acquires a plurality of traveling route information items with different recognition ranges on the basis of the traveling route information from the navigation system 6. The traveling route information acquiring unit 11 may create the plurality of traveling route information items (for example, the wide-area map 1, the middle-area map 2, and the local map 3) with different recognition ranges, or receive the plurality of traveling route information items with different recognition ranges from the navigation system 6.

The course generating unit 19 generates the course of the host vehicle using the plurality of traveling route information items according to a traveling environment. Examples of the traveling environment include traffic congestion on the road, obstacles, such as pedestrians or street-parking vehicles, and other surrounding vehicles traveling on the road. In addition, the course generating unit 19 may select the optimal traveling route information from the plurality of traveling route information items according to the traveling environment and generate the course of the host vehicle on the basis of the selected optimal traveling route information.

In addition, the driving assistance device 30 includes the driving assistance execution unit 20. The driving assistance execution unit 20 includes, for example, a brake ECU, an engine ECU, and a steering ECU and executes driving assistance for the host vehicle on the basis of the course generated by the course generating unit 19. For example, when the generated course avoids an obstacle, the steering ECU controls a steering angle to avoid the obstacle.

Figure 3:
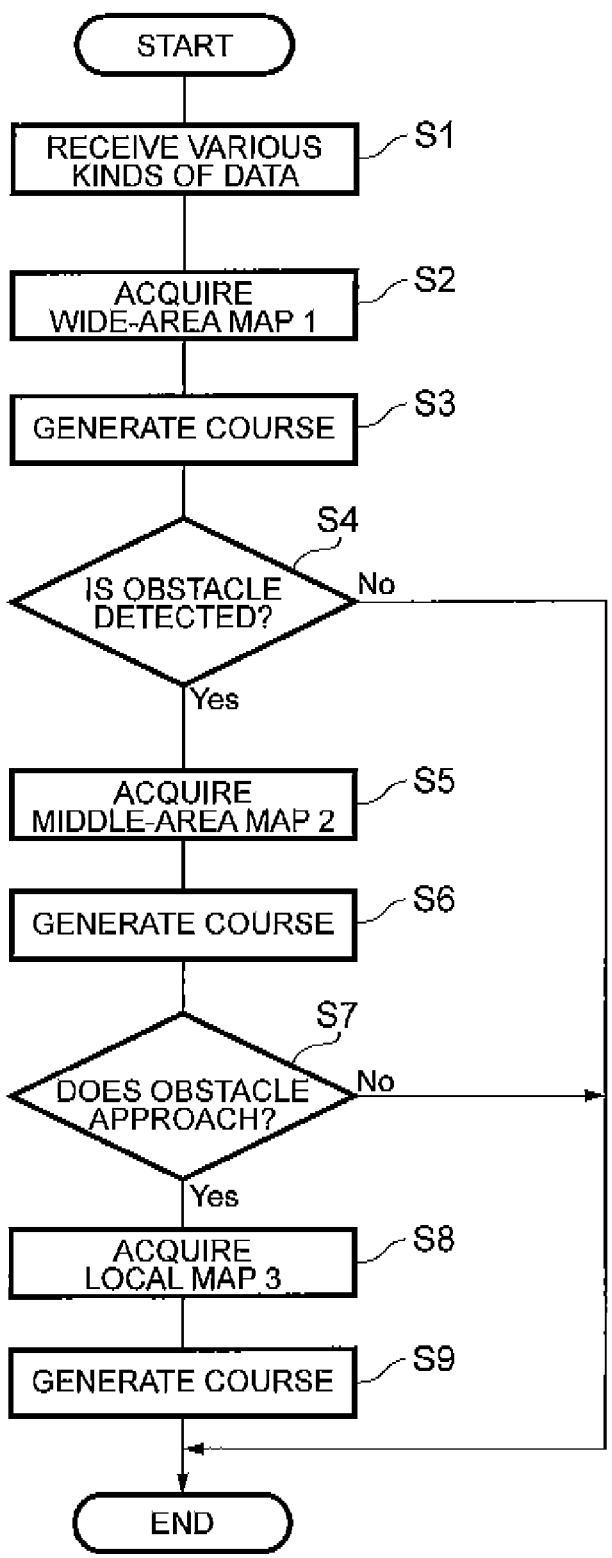
FIG. 3 is a flowchart illustrating an example of a control process performed by the driving assistance device according to the first embodiment of the invention.

FIG. 3 is a flowchart illustrating an example of a control process performed by the driving assistance device 30 according to this embodiment. The flowchart shown in FIG. 3 corresponds to a case in which the middle-area map 2 or the local map 3 with a scale less than that of the wide-area map 1 is acquired from the wide-area map 1. First, the ECU 10 receives various kinds of data from the navigation system 6 and the sensor 7 (S1). Then, the traveling route information acquiring unit 11 acquires the wide-area map 1 in order to determine the rough traveling route of the host vehicle from the start point to the destination (S2). The course generating unit 19 generates the course of the host vehicle on the basis of the acquired wide-area map 1 (S3).

The ECU 10 determines whether an obstacle is detected in the generated course. When it is determined that an obstacle is detected (S4), the traveling route information acquiring unit 11 acquires the middle-area map 2 in order to predict the movement of the obstacle (S5). The course generating unit 19 generates the course of the host vehicle on the basis of the acquired middle-area map 2 (S6).

The ECU 10 determines whether the obstacle is approaching on the generated course. When it is determined that the obstacle is approaching (S7), the traveling route information acquiring unit 11 acquires the local map 3 in order to avoid the obstacle (S8). The course generating unit 19 generates the course of the host vehicle on the basis of the acquired local map 3 (S9) and the driving assistance execution unit 20 performs an operation for avoiding the obstacle.

Figure 4:
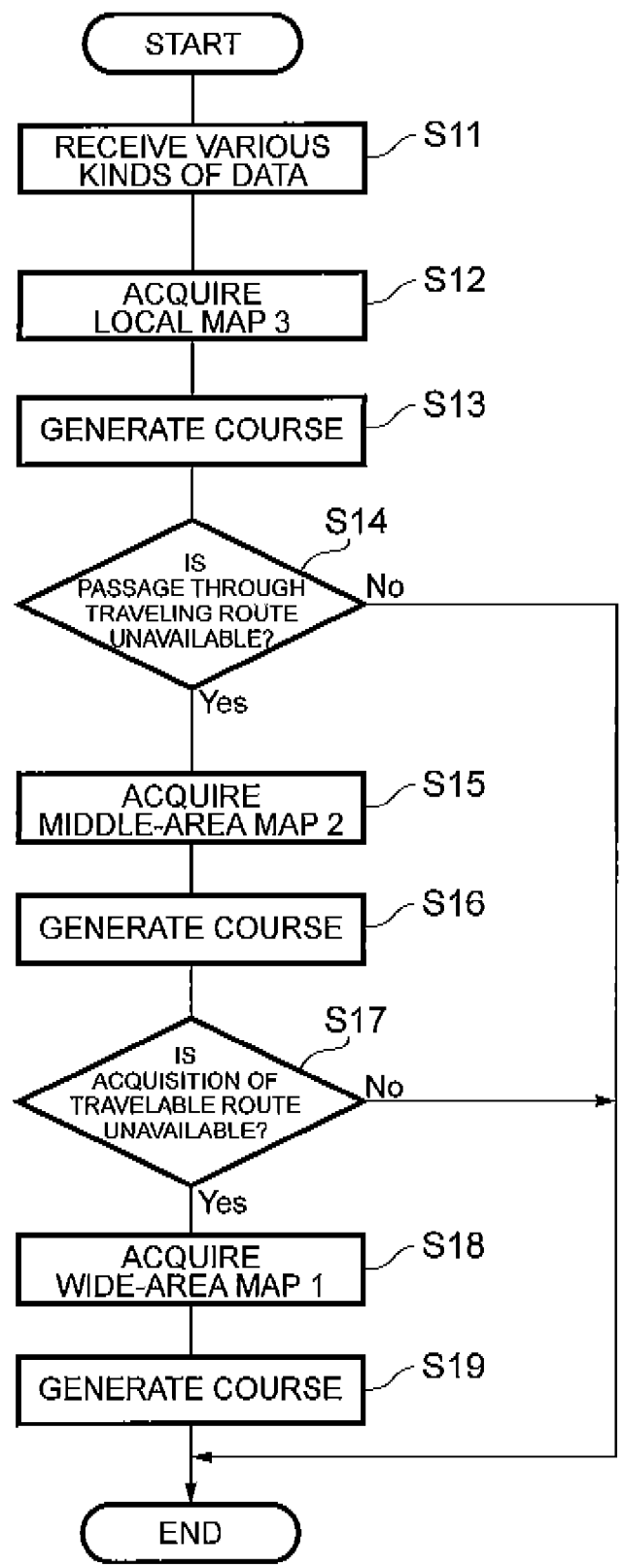
FIG. 4 is a flowchart illustrating an example of the control process performed by the driving assistance device according to the first embodiment of the invention.

FIG. 4 is also a flowchart illustrating an example of the control process performed by the driving assistance device 30 according to this embodiment and shows a case in which the middle-area map 2 and the wide-area map 1 with a scale more than that of the local map 3 are acquired instead of the local map 3. Similarly to FIG. 3, the ECU 10 receives various kinds of data from the navigation system 6 and the sensor 7 (S11). Then, the traveling route information acquiring unit 11 acquires the local map 3 in order to determine the traveling route of the host vehicle in a small-scale range (S12). The course generating unit 19 generates the course of the host vehicle on the basis of the acquired local map 3 (S13).

The ECU 10 determines whether the host vehicle can travel in the generated course. When it is determined that the host vehicle cannot pass through the traveling route (S14), the traveling route information acquiring unit 11 acquires the middle-area map 2 in order to check the traveling route in a wider range (S15). The course generating unit 19 generates the course of the host vehicle on the basis of the acquired middle-area map 2 (S16).

The ECU 10 determines whether the host vehicle can travel on the generated course. When it is determined that the host vehicle cannot pass through the traveling route (S17), the traveling route information acquiring unit 11 acquires the wide-area map 1 in order to check the traveling route in a wider range (S18). The course generating unit 19 generates the course of the host vehicle on the basis of the acquired wide-area map 1 (S19) and the driving assistance execution unit 20 controls the host vehicle.

As described above, the driving assistance device 30 according to the first embodiment includes the traveling route information acquiring unit 11 that acquires a plurality of traveling route information items with different recognition ranges and the course generating unit 19 that generates the course of the host vehicle using the plurality of traveling route information items according to the traveling environment. For example, when an obstacle is detected, the course of the vehicle is generated using small-scale traveling route information. Therefore, the host vehicle can travel safely, for example, the host vehicle can avoid the obstacle, as compared to a case in which traveling route information with a single recognition range is acquired as in the related art.

Second Embodiment

Figure 5:
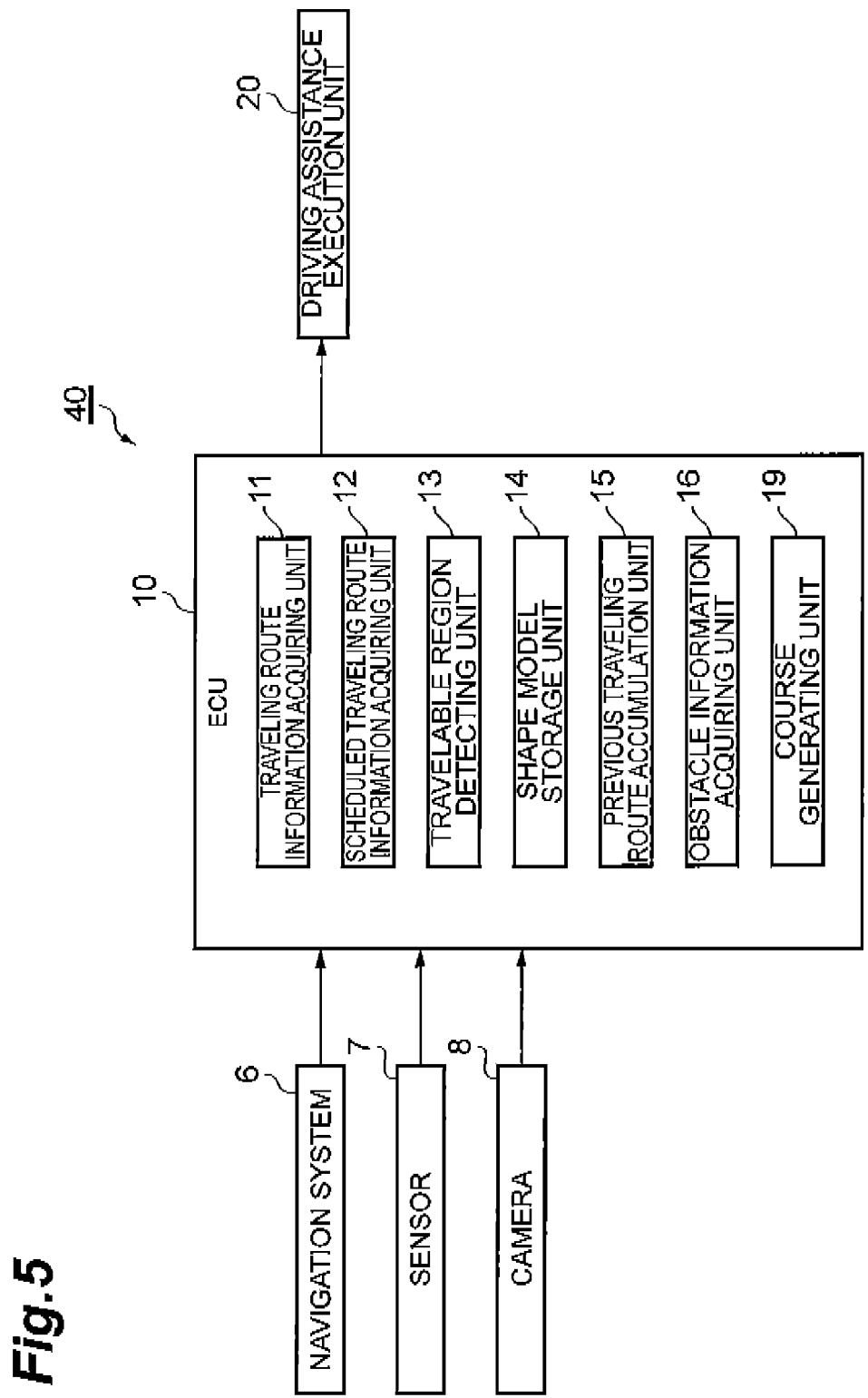
FIG. 5 is a block diagram illustrating a driving assistance device according to a second embodiment of the invention.

Next, a driving assistance device according to a second embodiment of the invention will be described. FIG. 5 is a block diagram illustrating the driving assistance device according to the second embodiment of the invention. As shown in FIG. 5, a driving assistance device 40 according to the second embodiment differs from the driving assistance device 30 according to the first embodiment in that the ECU 10 includes a scheduled traveling route information acquiring unit 12, a travelable region detecting unit 13, a shape model storage unit 14, a previous traveling route accumulation unit 15, and an obstacle information, acquiring unit 16 in addition to the traveling route information acquiring unit 11 and the course generating unit 19. Furthermore, the driving assistance device according to the second embodiment includes a camera 8 in addition to the navigation system 6 and the sensor 7.

The scheduled traveling route information acquiring unit 12 acquires scheduled traveling route information from traveling route information with a specific recognition range among a plurality of traveling route information items. For example, a wide-area map 1 is used as the traveling route information with a specific recognition range to acquire information about the scheduled route of the host vehicle to the destination.

The travelable region detecting unit 13 detects a region in which the host vehicle can travel in the traveling route. For example, the wide-area map 1 is used to acquire rough information about whether the road on which the vehicle is traveling is a two-lane road having one lane each way or an intersection. In addition, the sensor 7 is used to sense the side of the host vehicle to extract the side edge of a curbstone even when there is no white line on the road, thereby detecting the region in which the host vehicle can travel.

FIG. 6 is a diagram illustrating the scheduled traveling route information and the travelable region. For example, the wide-area map 1 is used to acquire the scheduled traveling route information. The sensor 7 detects the white line of the road on which the host vehicle is traveling and the shape of the scheduled traveling route is indicated on the coordinate axis, thereby estimating the travelable region. In addition, even when there is no white line on the road, the sensor 7 can detect the side edge of the road to estimate the shape of the scheduled traveling route on the road without a white line.

It is preferable that the scheduled traveling route be divided and estimated as shown in FIG. 6. When the scheduled traveling route is divided and estimated, it is possible to estimate the shape of the route with high accuracy.

Figure 9:
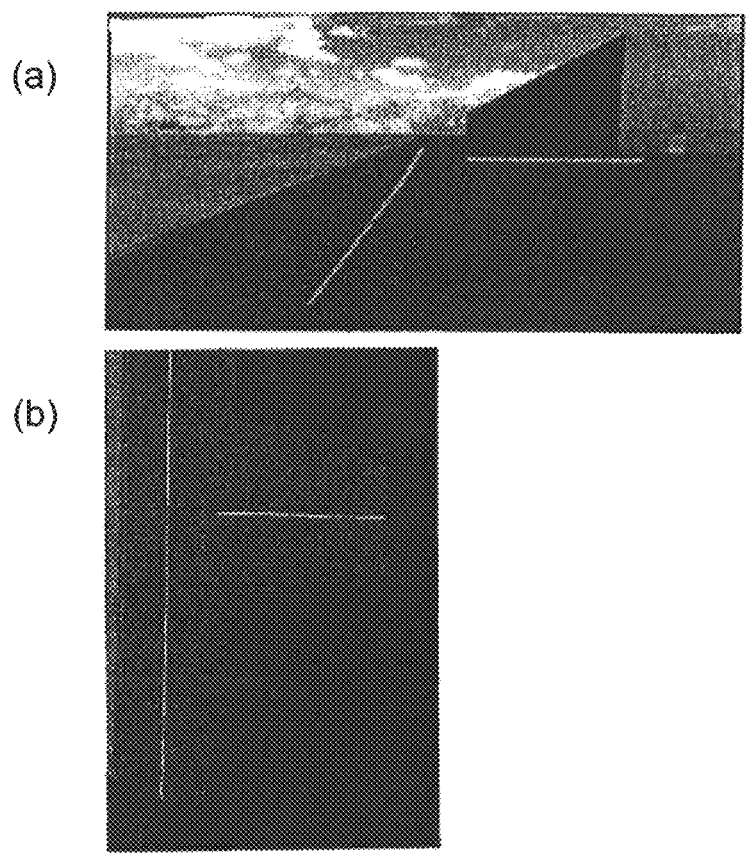
FIG. 9($a$) is a diagram illustrating a traveling route and FIG. 9($b$) is a diagram illustrating the estimated shape of a scheduled traveling route.

FIGS. 7(a), 8(a), and 9(a) are diagrams illustrating traveling routes and FIGS. 7(b), 8(b), and 9(b) are diagrams illustrating the shapes of the estimated scheduled traveling routes. For example, FIG. 7(a) shows a two-lane road that has one lane each way. In this case, a white line at the center of the road is used to detect the travelable region, thereby estimating the shape of the scheduled traveling route as shown in FIG. 7(b). FIG. 8(a) shows a case in which a traveling route is a one-way road and does not have a white line. In this case, the host vehicle extracts the side edge of the road to detect the travelable region, thereby estimating the shape of the scheduled traveling route as shown in FIG. 8(b). FIG. 9(a) shows a case in which a traveling route includes a right fork. In this case, information about the right fork is obtained from, for example, the traveling route information of the wide-area map 1 and the shape of the scheduled traveling route is estimated as shown in FIG. 9(b).

The shape model storage unit 14 stores the shape of the traveling route as a shape model. For example, as shown in FIG. 10(a), when the traveling route is sharply curved and there is an obstacle, such as another vehicle, in front of the host vehicle in the traveling route, the range in which the side edge of the traveling route can be detected is likely to be limited and the accuracy of the estimated shape of the scheduled traveling route is likely to be reduced.

In this case, the shape model of a curve with the same curvature as that of the traveling route is selected from the shape models stored in the shape model storage unit 14. In this way, it is possible to accurately estimate the shape of the scheduled traveling route including a portion in which the travelable region cannot be detected due to obstacles, as shown in FIG. 10(b).

Figure 11:
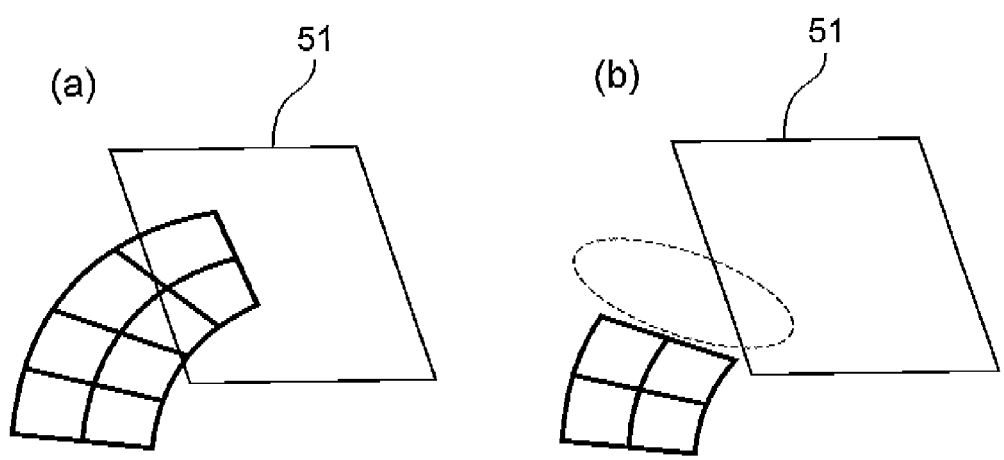
FIG. 11($a$) is a diagram illustrating an overlap between the shape model and a structure and FIG. 11($b$) is a diagram illustrating a divided shape model.

FIG. 11(a) is a diagram illustrating a case in which the shape model and a structure 51 overlap each other. In the case in which the shape model is used as described above, when the estimated shape is different from the measurement result or when the shape model does not fit well due to the structure 51, there is concern of the scheduled traveling route being erroneously estimated, as shown in FIG. 11(a). In this case, it is preferable that the shape model be divided according to, for example, the degree of coincidence between the shape model and a data of sensor and a model region with low reliability be removed. For example, the model region with low reliability is removed from the shape model storage unit 14 to generate divided shape models and the divided shape models are applied (see FIG. 11(b)). As such, when the divided shape models are used and only the model with high reliability is applied, an estimation error is reduced and it is possible to estimate the shape of the scheduled traveling route with high accuracy.

The previous traveling route accumulation unit 15 accumulates information about the previous traveling route on which the host vehicle has traveled. When the reliability of the accumulated previous traveling route information is high, the ECU 10 calculates the degree of coincidence between the estimated shape of the scheduled traveling route and the previous traveling route information. When the degree of coincidence is greater than a predetermined value, it is preferable to further estimate the shape. For example, a portion of the estimated shape of the scheduled traveling route is reexamined. The use of the accumulated previous traveling route information makes it possible to estimate the shape of the scheduled traveling route with high accuracy. In addition, similarly to the shape model, when there is a portion in which the travelable region cannot be detected due to obstacles, it is preferable to use the previous traveling route information.

Figure 12:
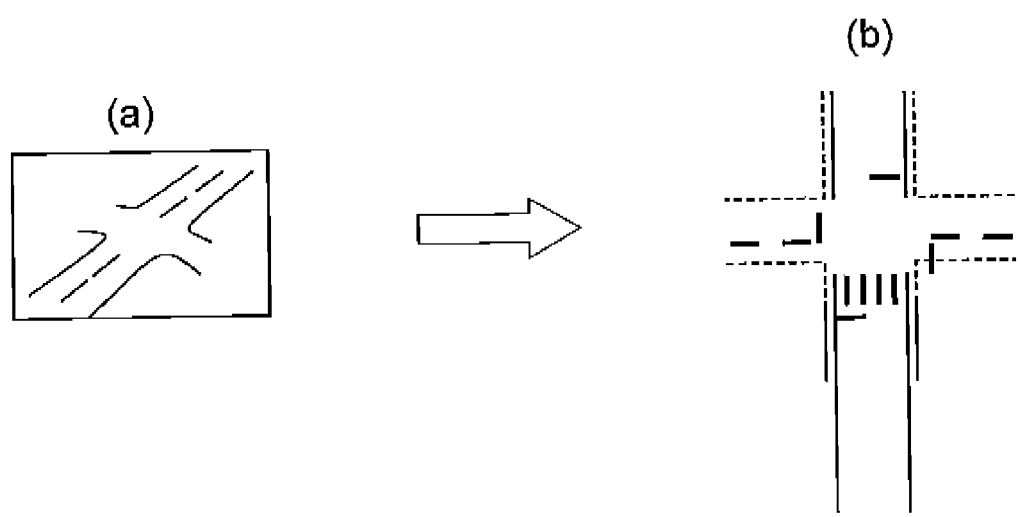
FIG. 12($a$) is a diagram illustrating previous traveling accumulation information and FIG. 12($b$) is a diagram illustrating the shape of a corrected scheduled traveling route.

FIG. 12(a) shows a map obtained from the previous traveling route information. Since the degree of coincidence between the previous traveling route information shown in FIG. 12(a) and the estimated shape of the scheduled traveling route shown in FIG. 12(b) is high, a portion of the estimated shape of the scheduled traveling route is reexamined using the previous traveling route information. In this way, it is possible to estimate the shape of the scheduled traveling route with high accuracy.

For example, in the case in which the host vehicle generates a course using the middle-area map 2, when the sensor 7 detects that an obstacle, such as a pedestrian, another vehicle, or a bicycle, comes out from a place which is not recognized as the road, it is assumed that there is a narrow path which is not indicated in the traveling route information in the vicinity of the place where the obstacle comes out. As such, it is preferable that the shape of the scheduled traveling route be estimated from, for example, a direction in which the pedestrian comes out, using the detection result or the tracking result of the obstacle as a trigger.

The obstacle information acquiring unit 16 acquires information about obstacles around the host vehicle. For example, a region in which the obstacle comes out or a boundary line is set or specified using the estimated shape of the scheduled traveling route, thereby detecting the obstacle. As shown in FIG. 13(a), the estimated shape of the scheduled traveling route is projected onto an image and a vertical edge is extracted or set from information about the edge of the shape, as shown in FIG. 13(b). In this way, a search range in which an obstacle is likely to come out is determined and information about obstacles around the host vehicle is acquired. At that time, it is preferable to set a horizontal boundary height or a color in order to accurately identify obstacles.

Figure 14:
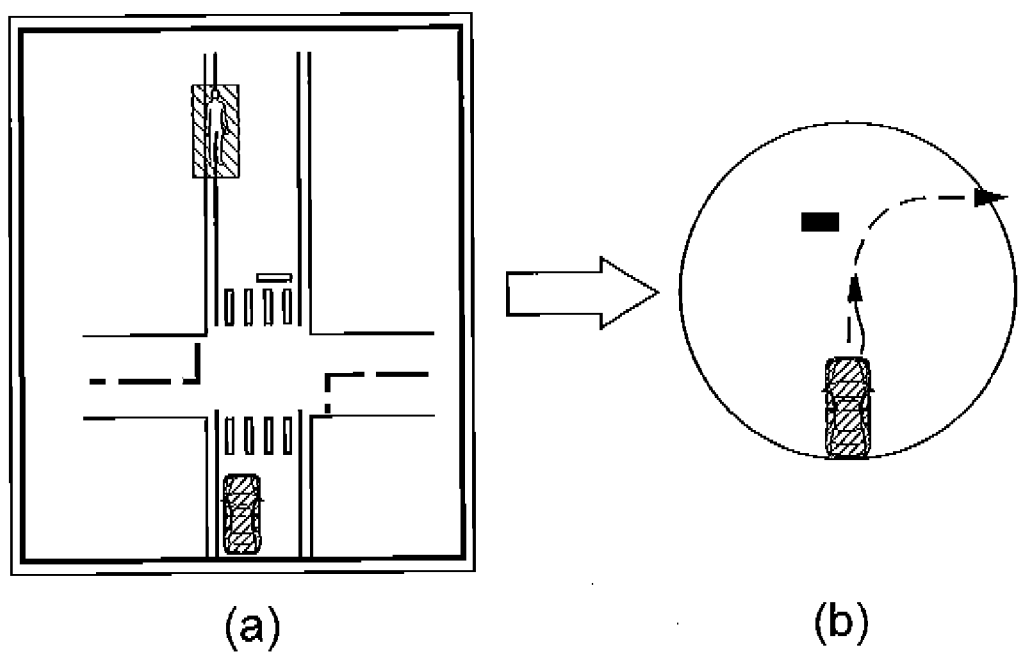
FIG. 14($a$) is a diagram illustrating the set movable range of an obstacle and FIG. 14($b$) is a diagram illustrating an avoidance behavior using small-scale traveling route information.

In addition, it is preferable that the obstacle information acquiring unit 16 set the movable range of obstacles around the host vehicle. For example, a behavior model corresponding to a road structure, which is the estimated shape of the scheduled traveling route, is created and the movable range of an obstacle is set, as shown in FIG. 14(a). When an obstacle is beyond the movable range, information about a small-scale traveling route is used to generate the course of the host vehicle relative to the obstacle with high safety, as shown in FIG. 14(b). As such, when the movable range of the obstacle is set, it is possible to improve the accuracy of prediction and reduce a calculation load when the obstacle is tracked. In addition, even when the number of obstacles increases, it is possible to track the obstacles, without being affected by an increase in calculation load.

Figure 15:
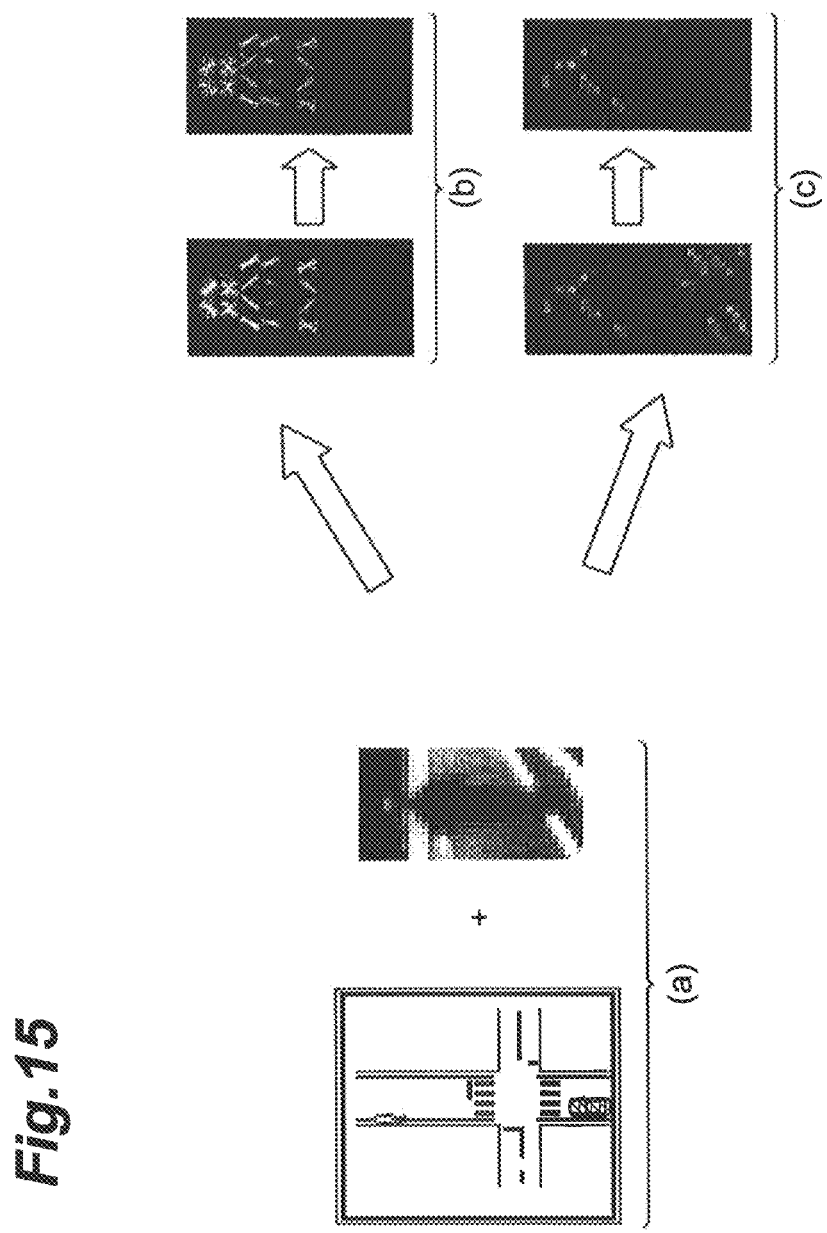
FIG. 15($a$) is a diagram illustrating image information about a pedestrian and FIGS. 15($b$) and 15($c$) are diagrams illustrating the removal of the edge of a road structure from the image.

It is preferable that the obstacle information acquiring unit 16 function as an image acquiring unit. The white line or side edge of the road is indispensable to specify the shape of the traveling route, but is unnecessary information when the pedestrian or the host vehicle is detected, which may cause a reduction in recognition rate. As shown in FIG. 15(a), for example, the camera 8 captures the image of the pedestrian and the ECU 10 acquires image information. Then, the image information and the estimated shape of the scheduled traveling route are used to remove road structure edge information. In this way, for example, the white line is removed from the image information and the pedestrian is specified. For example, the edge of the road structure is removed when a histogram is created, as shown in FIG. 15(b), or it may be removed from an edge image, as shown in FIG. 15 (c).

Figure 16:
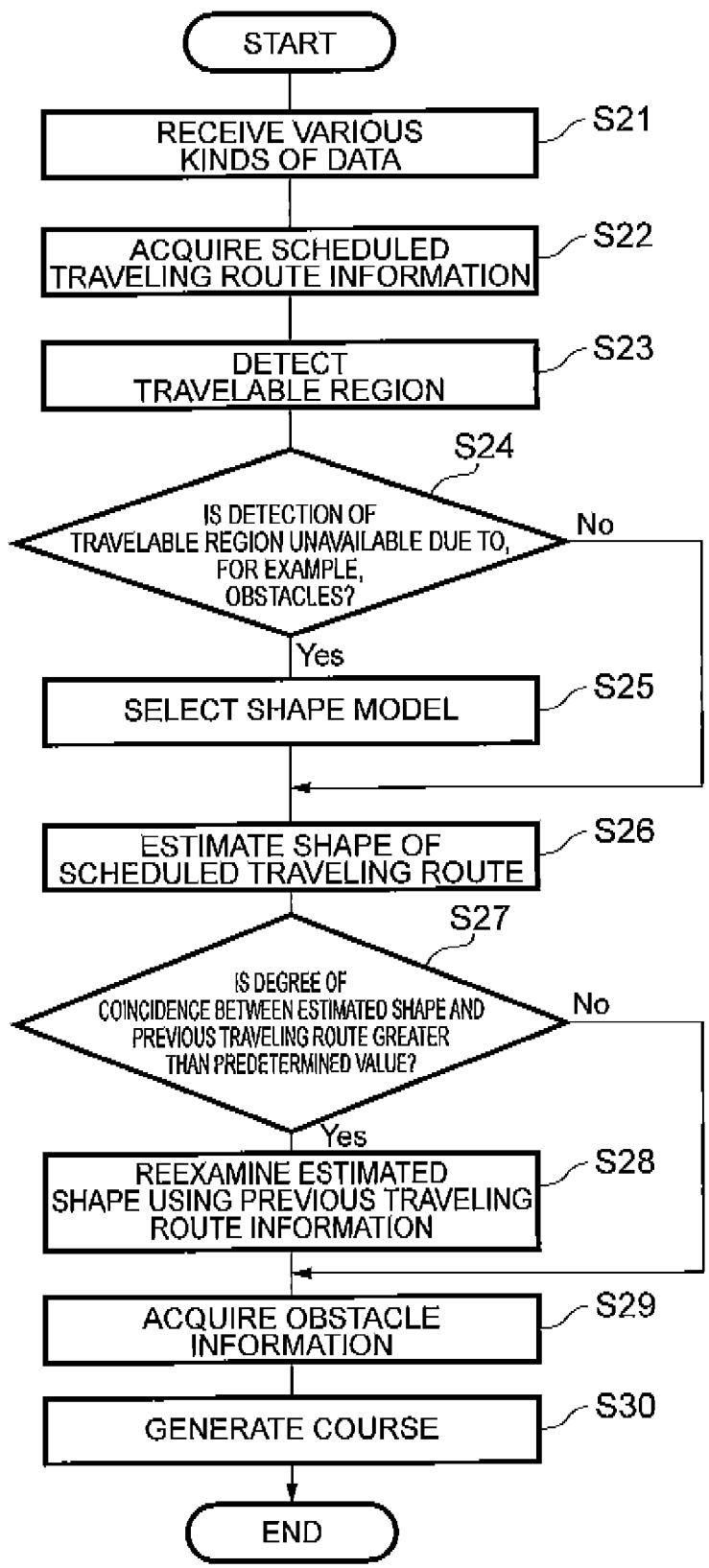
FIG. 16 is a flowchart illustrating an example of a control process performed by the driving assistance device according to the second embodiment of the invention.

FIG. 16 is a flowchart illustrating an example of a control process performed by the driving assistance device 40 according to this embodiment. First, the ECU 10 receives various kinds of data from the navigation system 6 and the sensor 7 (S21).

Then, the scheduled traveling route information acquiring unit 12 acquires scheduled traveling route information from traveling route information with a specific recognition range among a plurality of traveling route information items (S22). Then, the travelable region detecting unit 13 detects the region in, which the host vehicle can travel in the traveling route by extracting, for example, the side edge of the road using the sensor 7 (S23).

The ECU 10 estimates the shape of the scheduled traveling route from the scheduled traveling route information and the travelable region. When the travelable region cannot be detected due to, for example, obstacles (S24), the ECU 10 selects a similar shape model from the shape models stored in the shape model storage unit 14 (S25) and estimates the shape of the scheduled traveling route (S26).

The ECU 10 determines whether the degree of coincidence between the estimated shape of the scheduled traveling route and the previous traveling route information accumulated in the previous traveling route accumulation unit 15 is greater than a predetermined value (S27). When the degree of coincidence is greater than the predetermined value, the ECU 10 reexamines a portion of the estimated shape of the scheduled traveling route using the previous traveling route information (S28).

The obstacle information acquiring unit 16 acquires information about obstacles around the host vehicle. For example, a behavior model corresponding to a road structure, which is the estimated shape of the scheduled traveling route, is created and the movable range of the obstacles is set (S29). The course generating unit 19 generates the course of the host vehicle on the basis of the estimated shape of the scheduled traveling route or the obstacle information (S30), and the driving assistance execution unit 20 controls the host vehicle.

As described above, according to the driving assistance device of the second embodiment, the ECU 10 includes the scheduled traveling route information acquiring unit 12, the travelable region detecting unit 13, the shape model storage unit 14, the previous traveling route accumulation unit 15, and the obstacle information acquiring unit 16 in addition to the traveling route information acquiring unit 11 and the course generating unit 19. Therefore, it is possible to estimate the shape of the scheduled traveling route by the acquisition of the scheduled traveling route information and the detection of the travelable region. In addition, it is possible to estimate the shape of the scheduled traveling route with high accuracy, using the stored shape model or previous traveling route information, and the host vehicle can travel safely.

Third Embodiment

Next, a driving assistance device according to a third embodiment of the invention will be described. The driving assistance device according to the third embodiment differs from the driving assistance devices according to the first and second embodiments in that, among the plurality of traveling route information items, obstacle information in the traveling route information with a specific recognition range is integrated with traveling route information with a scale less than that of the traveling route information with the specific recognition range to create a grid of information, thereby estimating the obstacle information.

Figure 17:
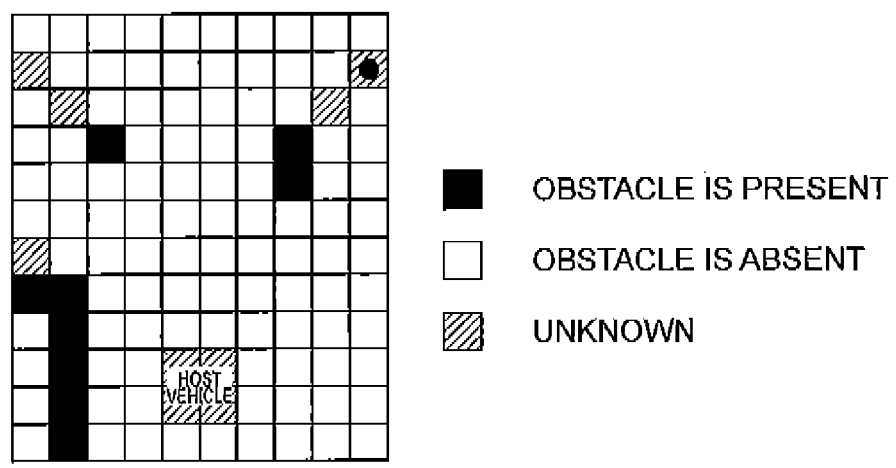
FIG. 17 is a diagram illustrating the creation of a grid of obstacles around the host vehicle using three types, that is, "an obstacle is present", "an obstacle is absent", and "unknown".

For example, when the attribute of obstacles is identified on a local map 3, there is a concern that a processing load will be increased and a processing period will be reduced. In addition, as shown in FIG. 17, when obstacles around the host vehicle are classified into three types, that is, "an obstacle is present", "an obstacle is absent", and "unknown" in a grid, in some cases, it is difficult to determine whether the obstacle is an object to be preferentially protected, such as a pedestrian, or an object, such as corrugated paper or a small object which is slightly damaged when it collides with the host vehicle.

The driving assistance device according to the third embodiment integrates obstacle information in the traveling route information with a specific recognition range among a plurality of traveling route information items with traveling route information with a scale less than that of the traveling route information with the specific recognition range to create a grid of information.

Figure 18:
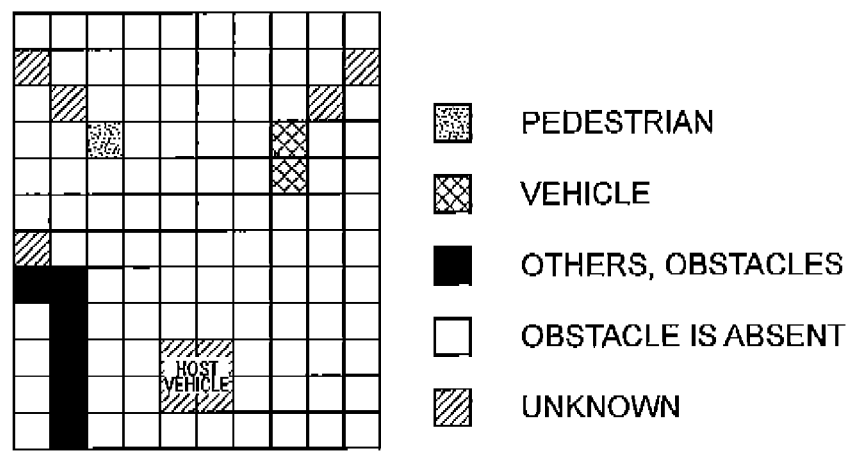
FIG. 18 is a diagram illustrating the creation of a grid of obstacles around the host vehicle using five types, that is, "pedestrian", "host vehicle", "other obstacles", "an obstacle is absent", and "unknown".

As shown in FIG. 18, it is preferable that the attributes of the obstacles be classified into five types, that is, "pedestrian", "host vehicle", "other obstacle", "an obstacle is absent", and "unknown" in a grid. As such, the attributes of the obstacles are clearly classified and arranged in a grid such that the host vehicle performs an avoidance behavior according to the attribute of the obstacle.

Figure 19:
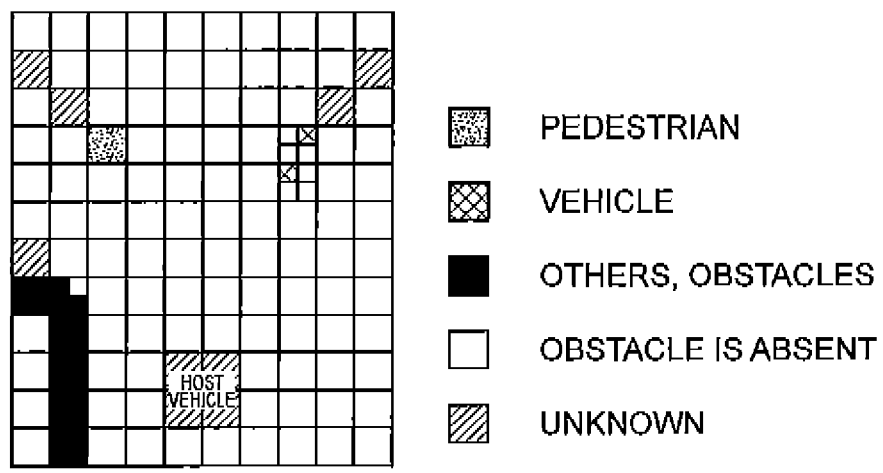
FIG. 19 is a diagram illustrating a grid, a portion of which is subdivided.

When the grid of the obstacle information is created, it is preferable that a portion of the grid be subdivided to estimate the obstacle information. For example, when the obstacle information from the middle-area map 2 is obscure like "other obstacles" in FIG. 18, a portion of the corresponding grid is subdivided as shown in FIG. 19. In this way, the obstacle information is estimated with high accuracy and the host vehicle performs appropriate avoidance determination.

Figure 20:
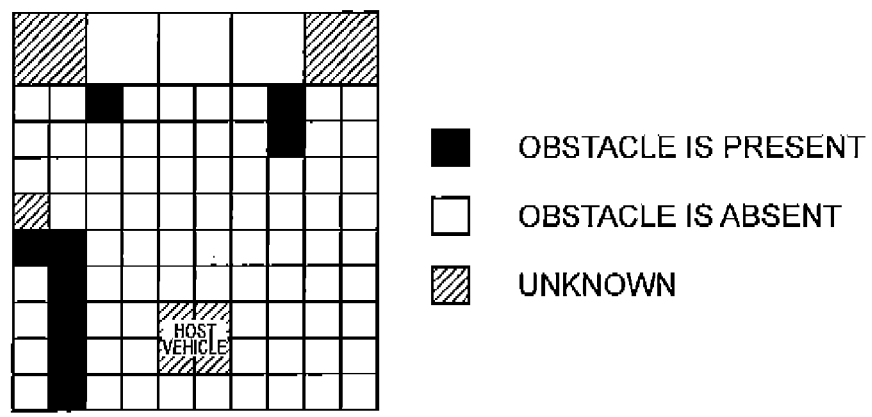
FIG. 20 is a diagram illustrating a grid which is coarser as the distance from the host vehicle increases and is finer as the distance decreases.

When the grid of the obstacle information is created, it is preferable that the grid be coarser as the distance from the host vehicle increases and the grid be finer as the distance from the host vehicle decreases. For example, as shown in FIG. 20, the grid of the obstacle which is close to the host vehicle is fine and the grid of a region which is far from the host vehicle is coarse. In this way, a region in the vicinity of the host vehicle is monitored by a fine grid. When danger is predicted, driving assistance is performed to prompt the user to reduce the speed. In this way, it is possible to ensure the safety of the host vehicle and improve processing efficiency.

Figure 21:
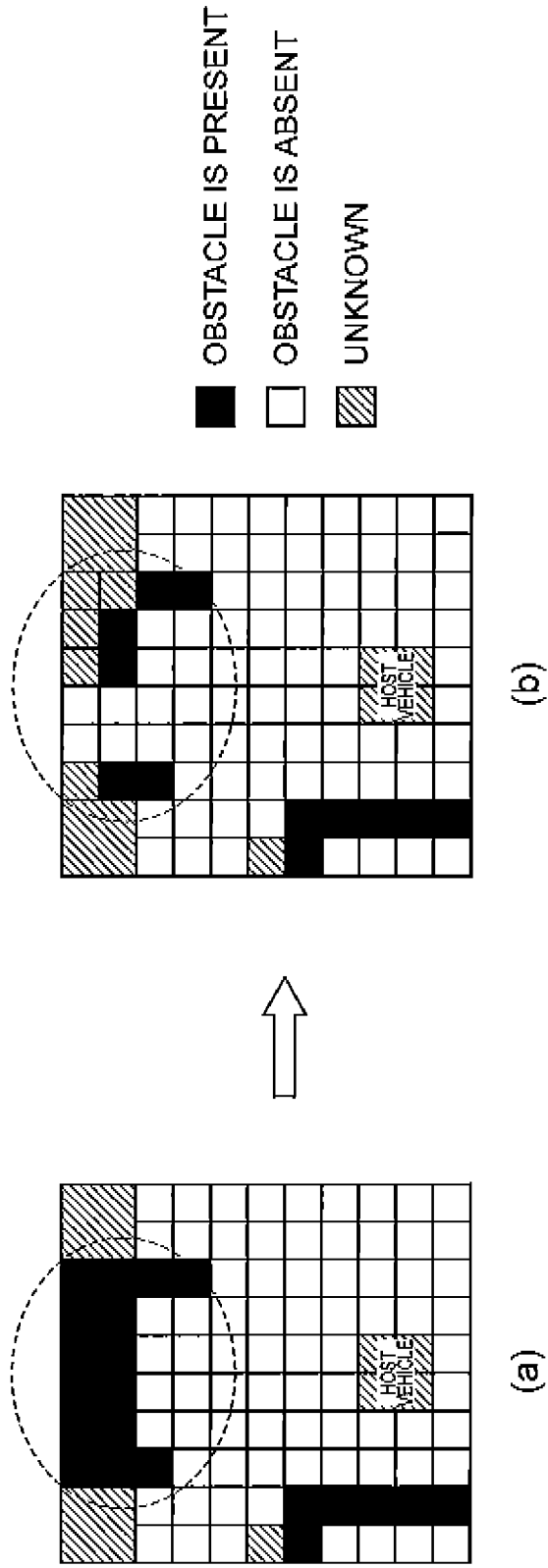
FIG. 21($a$) is a diagram illustrating a grid which is coarser as the distance from the host vehicle increases and FIG. 21($b$) is a diagram illustrating a grid which is subdivided by revolting.

As shown in FIG. 21(a), when it is detected that there is an obstacle in a region in which the grid is coarse since the distance from the host vehicle is long, it is preferable that only the region be revoted by a fine grid, as shown in FIG. 21(b). As such, when it is detected that there is an obstacle in a region that is far from the host vehicle, a fine grid is used and the host vehicle performs avoidance determination ahead of schedule.

Figure 22:
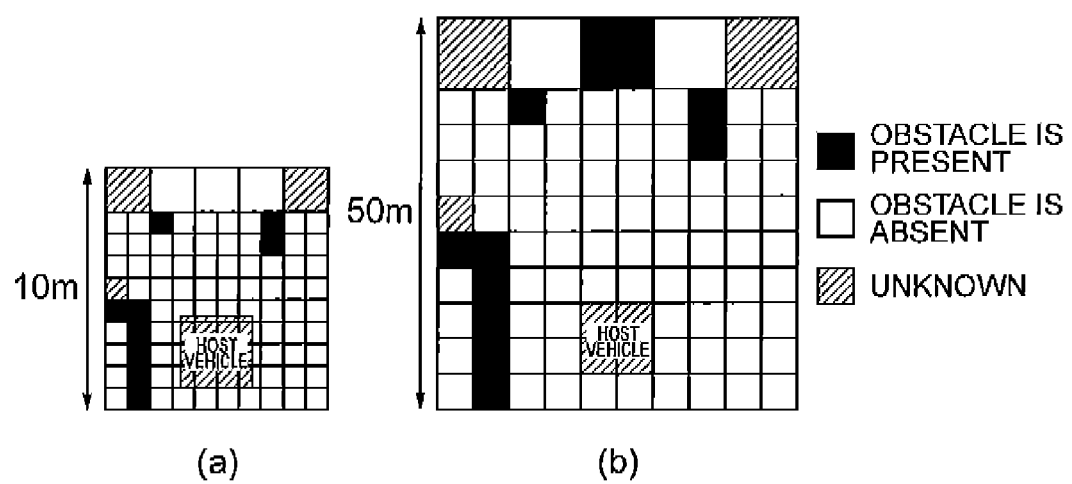
FIG. 22($a$) is a diagram illustrating a grid when the speed of the host vehicle is low and FIG. 22($b$) is a diagram illustrating a grid when the speed of the host vehicle is high.

When the grid of the obstacle information is created, it is preferable that the scale of the grid vary depending on the speed of the host vehicle. As shown in FIG. 22(a), when the speed of the host vehicle is low, a small-scale range of about 10 m is patterned in a fine grid. When the speed of the host vehicle is high, a large-scale range of about 50 m is patterned in a coarse grid, as shown in FIG. 22(b). In this way, it is possible to ensure the safety of the host vehicle and improve processing efficiency.

Figure 23:
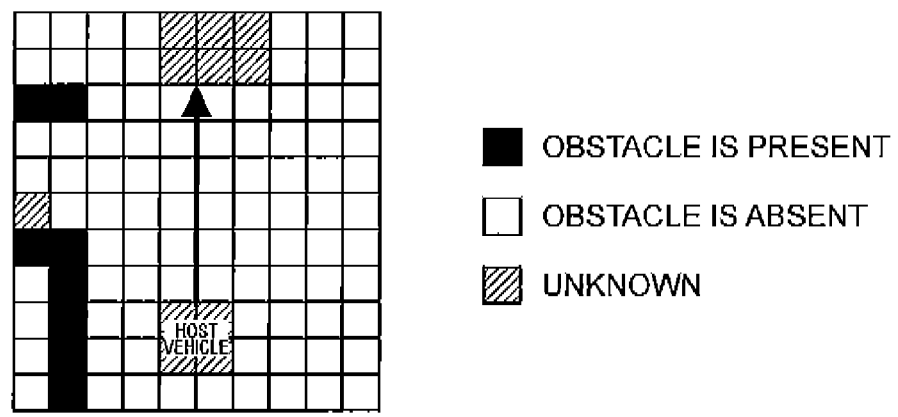
FIG. 23 is a diagram illustrating an unknown region in the grid.
Figure 24:
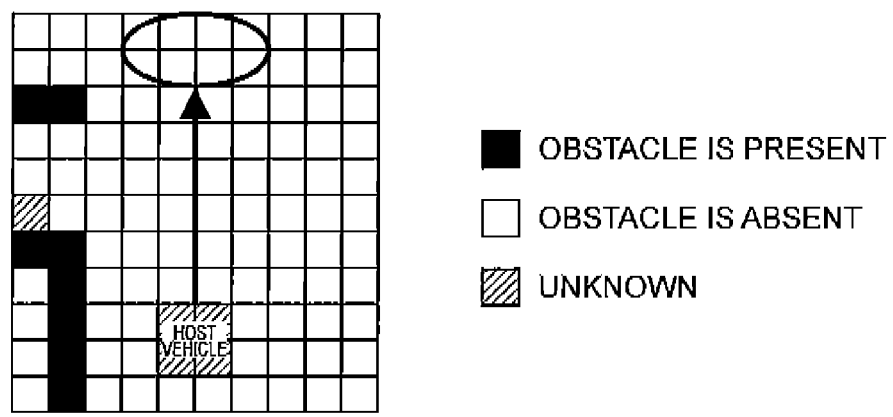
FIG. 24 is a diagram illustrating a grid in which an unknown region is overwritten as a region without an obstacle.

In the creation of the grid of the obstacle information, when the distance of the host vehicle from an unknown region is sufficiently long in the grid as shown in FIG. 23, it is preferable that a region without any obstacle be overwritten as the unknown region, as shown in FIG. 24. For example, for a region which is determined to be unknown since the reflection intensity of a millimeter-wave radar, which is the sensor 7, is low, in some cases, the course generating unit 19 generates a course considering that there is an unknown object in the traveling direction, and the driving assistance execution unit 20 reduces the speed of the host vehicle. However, when the unknown object is not an obstacle, the speed of the host vehicle is unnecessarily reduced, which hinders smooth driving. In contrast, as described above, when a region without any obstacle is overwritten as the unknown region, it is possible to reduce the arrival time of the host vehicle or smoothly drive the vehicle.

Figure 25:
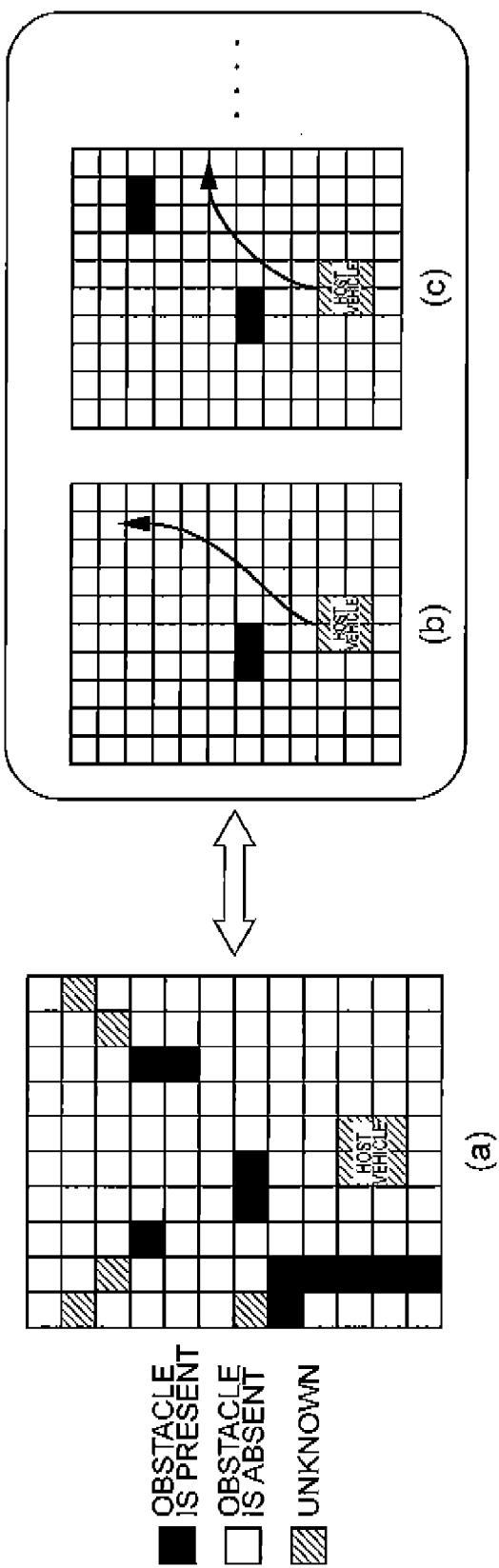
FIG. 25(a) is a diagram illustrating the creation of a grid of obstacle information and FIGS. 25(b) and 25(c) are diagrams illustrating a predetermined avoidance behavior read from a database.

Furthermore, when the grid of the obstacle information is created, it is preferable that the positional relationship of the obstacles and the avoidance behavior of the host vehicle be registered in the database in advance. When an obstacle appears suddenly, for example, when the pedestrian suddenly comes out, a driving assistance process which calculates, for example, a vehicle speed or a steering angle on-line is delayed and there is concern of the host vehicle colliding with the obstacle. In contrast, in the structure in which the positional relationship of the obstacles and the avoidance behavior of the host vehicle are registered in the database in advance, when the time to collision is short, the on-line calculation of the avoidance behavior is not performed, but a predetermined avoidance behavior read from the database is performed, as shown in FIGS. 25(b) and 25(c). In addition, since the obstacle information is patterned in a grid as shown in FIG. 25(a), information is compressed and matching can be performed at a high speed. Therefore, it is possible to perform determination involving the avoidance behavior in a short time.

Figure 26:
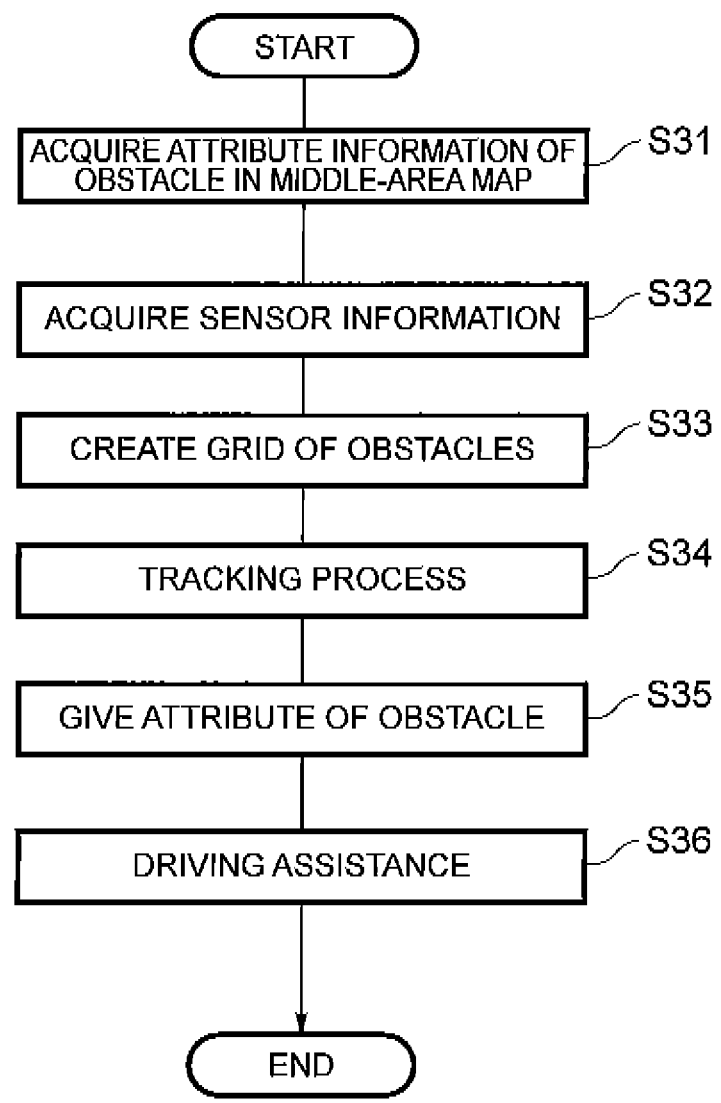
FIG. 26 is a flowchart illustrating an example of a control process performed by a driving assistance device according to a third embodiment of the invention.

FIG. 26 is a flowchart illustrating an example of the control process performed by the driving assistance device 40 according to this embodiment. As shown in FIG. 26, the obstacle information acquiring unit 16 acquires the attribute information of an obstacle in the middle-area map 2 (S31). Then, information about the surroundings of the obstacle is acquired from the sensor 7 (S32) and the attribute information of the middle-area map 2 is integrated with the obstacle information of the local map 3 to create a grid of information (S33). The obstacle information patterned in a grid is updated by tracking while the processing cycle thereof is maintained at a high speed (S34). The attribute of the obstacle is given (S35) and the driving assistance execution unit 20 performs driving assistance, such as an avoidance behavior (S36).

As described above, according to the driving assistance device of the third embodiment, since the obstacle information is patterned in a grid, the host vehicle can perform an avoidance behavior according to the attribute of obstacles and it is possible to ensure the safety of the host vehicle and improve processing efficiency.

The invention is not limited to the above-described embodiments. The ECU 10 may include a determining unit that determines whether an obstacle is detected or an obstacle is approaching as shown in FIG. 3 and determines whether the vehicle can travel in the traveling route as shown in FIG. 4.

Figure 27:
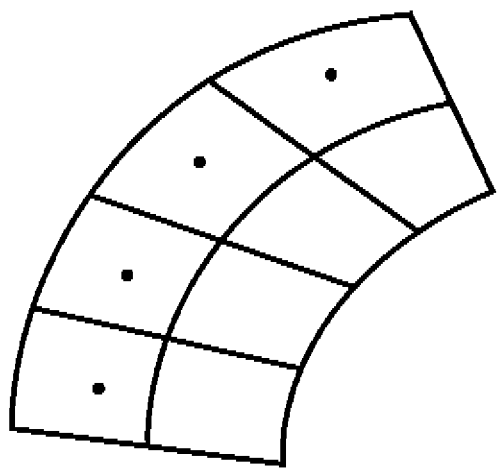
FIG. 27 is a diagram illustrating the setting of way points for making a route plan.

When the shape of the scheduled traveling route is estimated, a central portion of a node in the shape of the traveling route may be set as a way point, which is a target passage point of the path, as shown in FIG. 27. As such, since a route plan is made by setting the way point at the same time as the shape of the scheduled traveling route is estimated, it is possible to reduce the processing time, as compared to a case in which the route plan is made after the shape of the scheduled traveling route is estimated.

The side edge of the traveling route may include the side edge of the host vehicle and the side edge of a road which is, for example, several tens of meters ahead of the host vehicle and can be detected by the millimeter-wave radar.

INDUSTRIAL APPLICABILITY

The driving assistance device according to the invention includes traveling route information acquiring means that acquires a plurality of traveling route information items with different recognition ranges and course generating means that generates the course of the host vehicle using the plurality of traveling route information items according to a traveling environment. Therefore, the driving assistance device can generate a course such that the host vehicle can travel safely.

REFERENCE SIGNS LIST

1: WIDE-AREA MAP
2: MIDDLE-AREA MAP
3: LOCAL MAP
4: HOST VEHICLE
5: PEDESTRIAN
6: NAVIGATION SYSTEM
7: SENSOR
8: CAMERA
10: ECU
11: TRAVELING ROUTE INFORMATION ACQUIRING UNIT (ACQUIRING MEANS)
12: SCHEDULED TRAVELING ROUTE INFORMATION ACQUIRING UNIT (ACQUIRING MEANS)
13: TRAVELABLE REGION DETECTING UNIT (DETECTING MEANS)
14: SHAPE MODEL STORAGE UNIT (STORAGE MEANS)
15: PREVIOUS TRAVELING ROUTE ACCUMULATION UNIT (ACCUMULATION MEANS)
16: OBSTACLE INFORMATION ACQUIRING UNIT (ACQUIRING MEANS)

19: COURSE GENERATING UNIT (GENERATING MEANS)
20: DRIVING ASSISTANCE EXECUTION UNIT
30, 40: DRIVING ASSISTANCE DEVICE

The invention claimed is:

1. A driving assistance device comprising:
an electronic control unit which is configured to:
acquire a plurality of traveling route information items with different scales;
generate a course of a host vehicle using the plurality of traveling route information items according to a traveling environment,
wherein the electronic control unit is configured to increase the frequency of update of the traveling route information as the scale of the plurality of traveling route information items is reduced;
acquire scheduled traveling route information from the traveling route information with a specific scale among the plurality of traveling route information items;
detect a travelable region in a traveling route,
wherein the shape of a scheduled traveling route is estimated on the basis of the scheduled traveling route information and the travelable region; and
output driving assistance execution instructions or the generated course to execute driving assistance.

2. The driving assistance device according to claim 1,
wherein the scheduled traveling route is divided to estimate the shape.

3. The driving assistance device according to claim 1, wherein the electronic control unit is further configured to:
store the shape of the traveling route as a shape model, wherein the shape of the scheduled traveling route is estimated on the basis of the scheduled traveling route information and the shape model.

4. The driving assistance device according to claim 1, wherein the electronic control unit is further configured to:
accumulate previous traveling route information, wherein the shape of the scheduled traveling route is further estimated on the basis of the degree of coincidence between the previous traveling route information and the estimated shape of the scheduled traveling route.

5. The driving assistance device according to claim 1, wherein the electronic control unit is further configured to:
acquire information about an obstacle around the host vehicle, wherein a search range for acquiring the obstacle information is determined using information about an edge in the estimated shape of the scheduled traveling route.

6. The driving assistance device according to claim 1, wherein the electronic control unit is further configured to:
acquire information about an obstacle around the host vehicle, wherein a movable range of the obstacle in the estimated scheduled traveling route is set, and when the obstacle moves beyond the movable range, the course of the host vehicle for the obstacle is generated using the traveling route information with a scale less than that of the scheduled traveling route.

7. The driving assistance device according to claim 1, wherein the electronic control unit is further configured to:
acquire information about an obstacle around the host vehicle with an image, wherein the obstacle is specified on the basis of the image and the estimated shape of the scheduled traveling route.

8. The driving assistance device according to claim 1,
wherein obstacle information in the traveling route information with the specific scale among the plurality of traveling route information items is integrated with traveling route information with a scale less than that of the traveling route information about the specific scale to create a grid of information, thereby estimating the obstacle information.

9. The driving assistance device according to claim 8,
wherein a portion of the grid is subdivided.

10. The driving assistance device according to claim 8,
wherein the scale of the grid varies depending on a speed of the host vehicle.

11. An electronic control unit that is configured to:
acquire a plurality of traveling route information items with different scales; generate a course of a host vehicle using the plurality of traveling route information items according to a traveling environment, wherein the electronic control unit is further configured to increase the frequency of update of the traveling route information as the scale of the plurality of traveling route information items is reduced;
acquire scheduled traveling route information from the traveling route information with a specific scale among the plurality of traveling route information items;
detect a travelable region in a traveling route, wherein the shape of a scheduled traveling route is estimated on the basis of the scheduled traveling route information and the travelable region; and output driving assistance execution instructions or the generated course to execute driving assistance.

* * * * *